United States Patent [19]

Maruyama et al.

[11] Patent Number: 4,681,528
[45] Date of Patent: Jul. 21, 1987

[54] VALVE NOZZLE FOR INJECTION MOLDING

[75] Inventors: Yoshio Maruyama, Kyoto; Shoshi Kabashima, Hirakata, both of Japan

[73] Assignee: Matsushita Electric Industrial Co., Ltd., Osaka, Japan

[21] Appl. No.: 874,058

[22] Filed: Jun. 13, 1986

[30] Foreign Application Priority Data

Jun. 18, 1985 [JP] Japan .................. 60-132215

[51] Int. Cl.⁴ .................................. B29C 45/23
[52] U.S. Cl. .................. 425/562; 425/563; 425/564
[58] Field of Search ............ 425/562, 563, 564, 568

[56] References Cited

U.S. PATENT DOCUMENTS 3,954,209  5/1976  Ramond .................. 425/563
4,010,903  3/1977  Sakuri et al. ............ 425/563
4,427,361  1/1984  Saito ..................... 425/563

FOREIGN PATENT DOCUMENTS 163542  10/1982  Japan ................... 425/563

*Primary Examiner*—Jay H. Woo
*Assistant Examiner*—Timothy W. Heitbrink
*Attorney, Agent, or Firm*—Stevens, Davis, Miller & Mosher

[57] ABSTRACT

An injection molding valve nozzle comprises a nozzle head with a gate dividing a flow passage into two sections, a spool slidably attached to the gate and including axial grooves in its outer surface and a spring for urging the spool rearward. The valve nozzle is so arranged that the gate is closed by the spool because the grooves do not reach the gate upon lower pressure of resins below a certain level, but that the spool may slide forward to extend the grooves over the gate, communicating a front passage with a rear passage upon higher resin pressure above a certain level and that when the pressure differential between the front and rear passages decreases or the resin pressure descends below a certain level, the spool slides rearward by the spring for closing the gate.

Thus, the gate is closed by the spool until the resin pressure rises up to a certain level. The engaging portions of the gate and the spool may be made long depending on the pressure and viscosity of the resin so that the gap between the gate and the spool can be determined to be approximately 10 μm. Therefore, easy manufacturing of the valve nozzle is realized.

Further, although the resins flow into the gap, the spool surely slides forward during injection to spout the resin by the resin from the rear without remaining, deterioration and dissolution. Therefore, the life of the valve is improved.

2 Claims, 5 Drawing Figures

VALVE NOZZLE FOR INJECTION MOLDING

TECHNICAL FIELD

The present invention relates to a valve nozzle for injection molding of resins or the like.

BACKGROUND OF THE RELATED ART

In recent years, the demand for a valve nozzle for injection molding has increased during development of the automation of a molding process.

Conventionally, this kind of valve nozzle for injection molding is such constructed as shown in FIG. 5, which is disclosed in Japanese Patent Laid-open (Kokai) No. 163542/82. According to such prior art, a shut-off pin 4 slidably sustained on a torpedo 3a, 3b is biased toward a gate 2 formed in the front end of a nozzle head 1 by a spring 5 for closing a resin passage 6. When resins are supplied from the side of an adapter 7 and the pressure of the resins becomes greater than a certain extent or level, the spring 5 yields permitting rearward movement of the shut-off pin 4 for opening the gate 2.

In the above-mentioned structure, however, melted and highly-pressurized resins approximately at 1000 kg/cm$^2$ may flow into the gap between the torpedo 3a and the shut-off pin 4 and remain therein for a long time, impeding sliding of the shut-off pin 4 due to deterioration and dissolution of such remaining resins. Thus, there exists a problem that the gap should be formed with a high degree of accuracy in the order of about 1 μm for prevention of the entry of resins.

There also remains a problem that even when the gap is defined more accurately, resins can still continue to gradually penetrate into the gap. Resins enclosed within the gap are not allowed to be displaced anywhere so the that resins deteriorate and dissolve, thereby interfering with the sliding movement of the shut-off pin. The expected life span of the valve nozzle tends to be thus shortened.

DISCLOSURE OF THE INVENTION

It is an object of the invention to provide a long-life valve nozzle for injection molding which does not utilize any parts requiring high accuracy.

According to the present invention there is provided a valve nozzle for injection molding comprising a nozzle head with a gate which divides a flow passage into two sections or regions, a spool slidable movable towards and away from the gate, including grooves extending axially on the outer surface or periphery thereof, and a spring for urging the spool rearwardly, wherein when the pressure the of resins does not attain a certain extent or level, the grooves cannot arrive at the gate, to hold the gate at its a closed position, while when the resin pressure rises up to a certain level, the spool slides forward so that the grooves extend over the gate communicating a front passage with a rear passage, and when the resins are filled within a metallic mold so that the difference between the pressures of resin existing in the front and rear passages is reduced or the resin pressure descends below a certain level or value, the spool slides rearward closing the gate.

BEST MODE FOR CARRYING OUT THE INVENTION

A valve nozzle for injection molding according to one embodiment of the present invention will be described with reference to the drawings.

Figure 1:
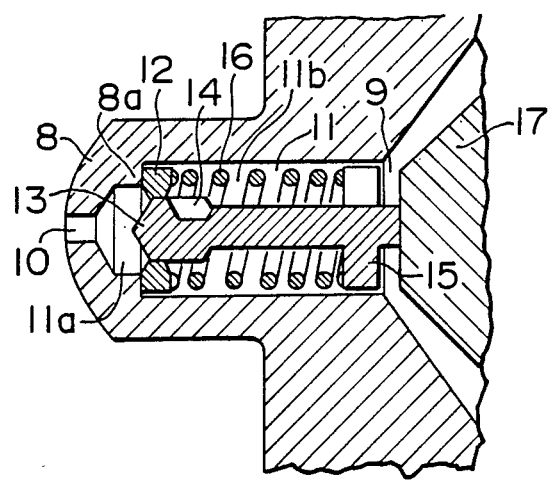
FIG. 1 is a cross-sectional view illustrating a valve nozzle, in its closed condition, for injection molding according to one embodiment of the present invention.

FIG. 1 is a cross-sectional view of a valve nozzle for injection molding which is in closed conditions, according to one embodiment of the present invention. In FIG. 1, reference numeral 8 designates a nozzle head, and 9 and 10 respectively designates an inlet for resin formed in the rear end of the nozzle head 8 and an outlet for resin, formed in the front end thereof respectively. Reference numeral 11 designate a flow passage for communication of the inlet 9 for resin with the outlet 10 for resin, and reference numeral 12 denotes a ring which divides this flow passage 11 into two regions and defines a gate. By the ring 12 defining the gate, the flow passage 11 is divided into a front passage 11a and a rear passage 11b. The ring 12 abuts against a stepped portion 8a formed in a portion of the flow passage 11.

Reference numeral 13 designates a spool which is slidably engaged with the inner periphery of the ring 12 defining the gate, and reference numeral 14 indicates grooves extending axially in the outer surface or periphery of the spool. Reference numeral 16 shows a spring having one end engaging with the projection 15 and the other end acting against the stepped portion 8a through the ring 12 for urging the spool 13 rearward. Reference numeral 17 designates a portion of a torpedo.

With respect to the valve nozzle for injection molding constructed in the above-mentioned manner, the operation thereof will be described hereinafter with reference to FIGS. 1, 2, 3 and 4.

Figure 2:
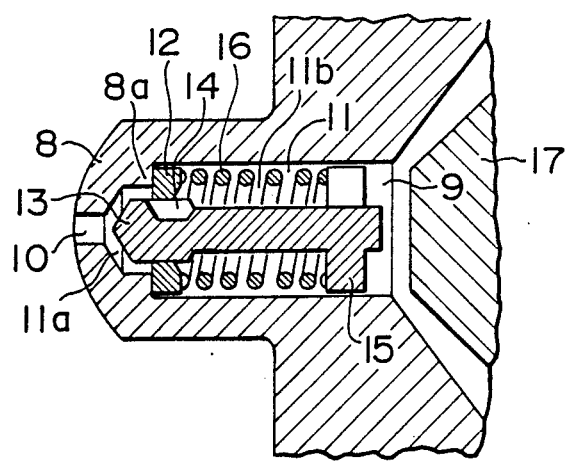
FIG. 2 is a cross-sectional view of the valve nozzle in its opened conditions.
Figure 3:
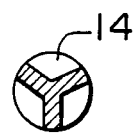
FIG. 3 is a vertical sectional view illustrating a spool, along a plane perpendicular to the axes of grooves in the spool.
Figure 4:
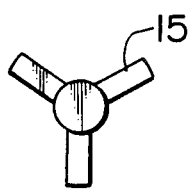
FIG. 4 is a perspective view illustrating the spool, as viewed from the rear side.
Figure 5:
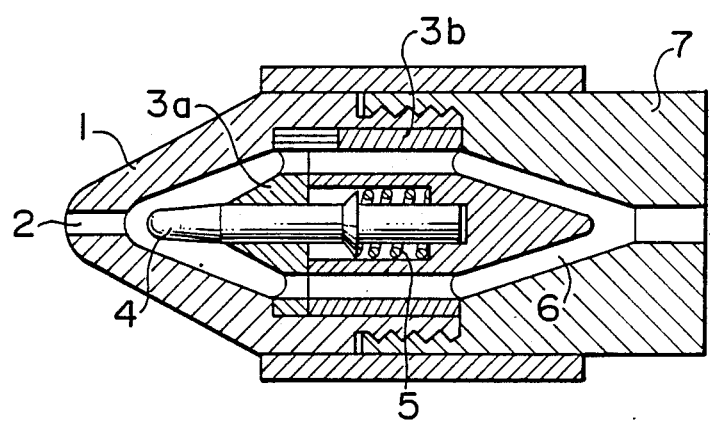
FIG. 5 is a cross-sectional view illustrating a conventional valve nozzle for injection known molding in the art.

Now, FIG. 2 shows opened conditions of a valve nozzle in cross-section. FIG. 3 shows a vertical sectional view of the spool 13 perpendicular to the axes of the grooves 14. FIG. 4 illustrates the spool 13, as viewed from the rear side.

In FIG. 1, the spool 13 is urged rearward by means of the spring 16 as long as the resin pressure does not reach a prescribed level, and the grooves 14 extending axially on the outer periphery of the spool 13 do not arrive at the location of the gate-defining ring 12. For the reasons, the inner periphery of the ring 12 and the spool 13 are tightly fitted with each other so that the flow passage 11 is closed by resin viscosity.

In FIG. 2, when resins are supplied through the resin inlet 9 and the pressure of the resins reaches a certain value, the spring 16 yielding to the force caused by the resin pressure permits the spool 13 to slide forward, so that the grooves 14 extend over the gate defining ring 12 communicating the front passage 11a with the rear passage 11b. Thus, the flow passage 11 is opened to allow the melted and pressurized resins to spout from the resin outlet 10. Simultaneously, the resins contained within the gap between the ring 12 and the spool 13 are carried away by resins supplied from the rear side. When the resins fills the interior in a metallic mold, the difference in the pressures between the front passage 11a and the, rear passage 11b is reduced or the resin pressure falls to below a prescribed level, so that the spool 13 slides rearward closing the flow passage 11.

As previously mentioned, the embodiment of the invention comprises the nozzle head 8, the ring 12 which defines the gate for separating the flow passage 11 into two regions, the spool 13 slidably attached on the ring 12 and including the grooves 14 extending axially on the outer periphery thereof, and the spring 16 for urging the spool 13 rearward. Also, the embodiment is so arranged that the flow passage 11 may be opened while the grooves 14 extend over the gate-defining ring 12 under exertion of the resin pressure, or the passage may be closed by the spring 16. Thus, the following effects can be obtained.

(1) The gap between the ring 12 and the spool 13 can be set at approximately 10 μm because the engaging portion thereof is possible to be long depending on the pressure and viscosity of the resins. Therefore, it is easy to manufacture the valve nozzle of the present invention.

(2) The resins which flow into the gap between the ring 12 and the spool 13 are carried away by means of the resins coming from the rear during injection without remaining, deteriorating and, dissolving, thereby assuring that the spool will slide. Therefore, the life span of the present invention is increasingly improved.

(3) The resin remaining on the metallic mold side is sucked upon closing of the flow passage 11, so that the resin is finely cut off.

(4) Formation of the gate by means of the ring 12 makes it easy to manufacture the valve nozzle of the present invention.

INDUSTRIAL APPLICABILITY

As mentioned above, the present invention comprises a gate dividing a flow passage into two regions; a spool slidably mounted on the gate and including grooves extending axially in the outer periphery thereof, said grooves being so arranged as not to arrive at the gate when resin pressure does not attain a certain extent, but that the force exerted by the resin pressure allows the grooves to slide forward extending over the gate for communication of both a front passage and a rear passage when the resin pressure rises up to the predetermined level; and a spring for urging the spool rearward. Thus, the gap between the gate and the spool can have a large size because the engaging portion of such components may be made long, whereby it facilitates the manufacture of the valve. Further, the resins which flow into the gap between the gate and the spool are carried away by a flow of the resin from the upstream during injection without remaining, deteriorating or dissolving, thereby precluding interference of the slidable movement of the spool. Therefore, the life span of the present invention is further improved.

What is claimed is:

1. An injection molding valve nozzle for supplying melted and pressurized resin into a metallic mold comprising:

a nozzle head including a resin inlet at a rear end, a resin injection outlet for discharge resin into said mold at a front end and a resin flow passage between said inlet and outlet;

a gate for separating said resin flow passage into a front passage and a rear passage;

a spool slidably mounted for movement towards and away from said outlet and including at least one groove extending axially along the outer surface of said spool for opening and closing a flow port in said gate upon movement of said spool towards and away from said outlet, a spring disposed in said resin flow passage for biassing said spool in a direction away from said outlet, said spool being movable by forces applied thereto by said spring and by resin pressure existing in said first and second passages, said groove being arranged on said spool such that it does not move to a position to open said flow port until resin pressure in said rear passage attains a predetermined value, said spring biassing said spool to a position where said groove no longer opens said flow port when a pressure difference which exists between said front and rear passages is reduced to below a predetermined value.

2. A valve nozzle for injection molding according to claim 1, characterized in that a gate is formed by a ring.

* * * * *